United States Patent
Tsai et al.

(10) Patent No.: US 11,153,607 B2
(45) Date of Patent: Oct. 19, 2021

(54) LENGTH-ADAPTIVE DEBLOCKING FILTERING IN VIDEO CODING

(71) Applicant: MEDIATEK INC., Hsinchu (TW)

(72) Inventors: Chia-Ming Tsai, Hsinchu (TW);
Tzu-Der Chuang, Hsinchu (TW);
Chih-Wei Hsu, Hsinchu (TW);
Ching-Yeh Chen, Hsinchu (TW);
Yu-Wen Huang, Hsinchu (TW)

(73) Assignee: MEDIATEK INC., Hsinchu (TW)

(*) Notice: Subject to any disclaimer, the term of this patent is extended or adjusted under 35 U.S.C. 154(b) by 0 days.

(21) Appl. No.: 16/216,650

(22) Filed: Dec. 11, 2018

(65) Prior Publication Data

US 2019/0238890 A1 Aug. 1, 2019

Related U.S. Application Data

(60) Provisional application No. 62/622,980, filed on Jan. 29, 2018.

(51) Int. Cl.
*H04B 1/66* (2006.01)
*H04N 7/12* (2006.01)
(Continued)

(52) U.S. Cl.
CPC .......... *H04N 19/86* (2014.11); *H04N 19/117* (2014.11); *H04N 19/132* (2014.11);
(Continued)

(58) Field of Classification Search
CPC ....... H04N 19/86; H04N 19/117; H04N 19/82
See application file for complete search history.

(56) References Cited

U.S. PATENT DOCUMENTS

| 8,761,538 B2 | 6/2014 | Pereira et al. |
| 9,414,066 B2 | 8/2016 | Norkin et al. |

(Continued)

FOREIGN PATENT DOCUMENTS

| CN | 101754015 A | 6/2010 |
| CN | 103299632 A | 9/2013 |

(Continued)

OTHER PUBLICATIONS

International Search Report and Written Opinion dated Mar. 6, 2019, in PCT/CN2018/122317, 10 pages.

*Primary Examiner* — Fabio S Lima
(74) *Attorney, Agent, or Firm* — Oblon, McClelland, Maier & Neustadt, L.L.P.

(57) ABSTRACT

A deblocking filtering method includes receiving reconstructed video data associated with a block boundary in a video coding system. The block boundary has N lines of samples crossing the block boundary from a P side to a Q side of the boundary. The method further includes determining whether to apply a first filter set to reduce block artifacts at the block boundary based on whether a first inter-side difference of a first line of the N lines of samples is greater than an inter-side difference threshold, determining a filter length of a filter in the first filter set based on a first side length of the P side, and a second side length of the Q side when it is determined to apply the first filter set, and applying at least one filter in the first filter set with the determined filter length on the block boundary.

20 Claims, 10 Drawing Sheets

(51) Int. Cl.
*H04N 11/02* (2006.01)
*H04N 11/04* (2006.01)
*H04N 19/86* (2014.01)
*H04N 19/117* (2014.01)
*H04N 19/132* (2014.01)
*H04N 19/137* (2014.01)
*H04N 19/176* (2014.01)
*H04N 19/80* (2014.01)

(52) U.S. Cl.
CPC ......... *H04N 19/137* (2014.11); *H04N 19/176* (2014.11); *H04N 19/80* (2014.11)

(56) References Cited

U.S. PATENT DOCUMENTS

| | | | |
|---|---|---|---|
| 9,554,128 B2 | 1/2017 | Hsu et al. | |
| 9,729,879 B2 | 8/2017 | An et al. | |
| 9,942,574 B2 | 4/2018 | Norkin et al. | |
| 10,003,798 B2 | 6/2018 | Hsu et al. | |
| 10,148,979 B2 * | 12/2018 | Narroschke | H04N 19/174 |
| 2008/0019605 A1 * | 1/2008 | Yea | G06T 5/50 |
| | | | 382/261 |
| 2010/0142844 A1 * | 6/2010 | Pereira | H04N 19/117 |
| | | | 382/261 |
| 2010/0183068 A1 * | 7/2010 | Pandit | H04N 19/119 |
| | | | 375/240.02 |
| 2013/0028531 A1 * | 1/2013 | Sato | H04N 19/60 |
| | | | 382/233 |
| 2013/0156111 A1 * | 6/2013 | Lee | H04N 19/86 |
| | | | 375/240.24 |
| 2013/0266061 A1 | 10/2013 | An et al. | |
| 2013/0287124 A1 | 10/2013 | Norkin et al. | |
| 2014/0112396 A1 * | 4/2014 | Ikeda | H04N 19/124 |
| | | | 375/240.29 |
| 2014/0185689 A1 * | 7/2014 | Narroschke | H04N 19/13 |
| | | | 375/240.24 |
| 2014/0211848 A1 | 7/2014 | Hsu et al. | |
| 2015/0071356 A1 * | 3/2015 | Kim | H04N 19/187 |
| | | | 375/240.16 |
| 2015/0237380 A1 * | 8/2015 | Sadafale | H04N 19/186 |
| | | | 375/240.02 |
| 2016/0366422 A1 * | 12/2016 | Yin | H04N 19/649 |
| 2017/0013280 A1 | 1/2017 | Norkin et al. | |
| 2017/0094273 A1 | 3/2017 | Hsu et al. | |
| 2017/0302966 A1 | 10/2017 | Xu et al. | |
| 2018/0077414 A1 * | 3/2018 | Reddy | H04N 19/82 |
| 2018/0205970 A1 | 7/2018 | Norkin et al. | |
| 2019/0268594 A1 * | 8/2019 | Lim | H04N 19/80 |

FOREIGN PATENT DOCUMENTS

| | | |
|---|---|---|
| CN | 103947208 A | 7/2014 |
| CN | 106131555 A | 11/2016 |
| CN | 107079162 A | 8/2017 |
| WO | WO 2016/123749 A1 | 8/2016 |

\* cited by examiner

| CONDITIONS | Bs |
|---|---|
| AT LEAST ONE OF THE BLOCKS IS INTRA | 2 |
| AT LEAST ONE OF THE BLOCKS HAS NON-ZERO CODED RESIDUAL COEFFICIENT AND BOUNDARY IS A TRANSFORM BOUNDARY | 1 |
| ABSOLUTE DIFFERENCES BETWEEN CORRESPONDING SPATIAL MOTION VECTOR COMPONENTS OF THE TWO BLOCKS ARE >= 1 IN UNITS OF INTER PIXELS | 1 |
| MOTION-COMPENSATED PREDICTION FOR THE TWO BLOCKS REFERS TO DIFFERENT REFERENCE PICTURES OR THE NUMBER OF MOTION VECTORS IS DIFFERENT FOR THE TWO BLOCKS | 1 |
| OTHERWISE | 0 |

*FIG. 5*

LENGTH-ADAPTIVE DEBLOCKING FILTERING IN VIDEO CODING

INCORPORATION BY REFERENCE

This present disclosure claims the benefit of U.S. Provisional Application No. 62/622,980, "Length-Adaptive Deblocking Method for Image and Video Coding" filed on Jan. 29, 2018, which is incorporated herein by reference in its entirety.

TECHNICAL FIELD

The present disclosure relates to video coding technology.

BACKGROUND

Block based video compression causes visible discontinuities at block boundaries. Deblocking processing modifies samples near the block boundaries, by employment of deblocking filters, such that the discontinuities at the block boundaries can be smoothed and video quality can be improved. The visible discontinuities at the block boundaries are known as block artifacts.

SUMMARY

Aspects of the disclosure provide a deblocking filtering method. The method can include receiving reconstructed video data associated with a block boundary between coding blocks in a video coding system, the block boundary having N lines of samples crossing the block boundary from a P side of the boundary to a Q side of the boundary, determining whether to apply a first filter set to reduce block artifacts at the block boundary, which includes determining whether a first inter-side difference of a first line of the N lines of samples is greater than an inter-side difference threshold, the first inter-side difference indicating a sample value difference between the P side and the Q side of the block boundary, determining a filter length of a filter in the first filter set based on a first side length ($len_p$) of samples in each line of samples at the P side, and a second side length ($len_q$) of samples in each line of samples at the Q side when it is determined to apply the first filter set at the block boundary, and applying at least one filter in the first filter set with the determined filter length on the block boundary.

In an embodiment, the determining whether to apply the first filter set to reduce block artifacts at the block boundary further includes determining whether an intra-side difference of the first line of the N lines of samples is smaller than an intra-side difference threshold, the intra-side difference indicating variations of sample values at the P side and Q side of the first line of the N lines of samples.

In one example, the intra-side difference of the first line of the N lines of samples is determined according to:

$$\Sigma_{s=0}^{len_p-1}(m_s \times |p_s - p_x|) + \Sigma_{t=0}^{len_q-1}(n_t \times |q_t - q_y|),$$

where $0 < x < len_p - 1$, $0 < y < len_q - 1$, $m_s$ can be 0 or 1, and $n_t$ can be 0 or 1.

In an embodiment, the determining whether to apply the first filter set to reduce block artifacts at the block boundary further includes determining whether a number of consecutive lines among the N lines of samples is equal to or greater than a continuity threshold, each line of the consecutive lines satisfying a same set of conditions for determining whether to apply the first filter set to reduce block artifacts at the block boundary.

In an embodiment, determining whether to apply the first filter set to reduce block artifacts at the block boundary further includes when the block boundary is a region boundary associated with a line buffer having a size of M lines, determining a filter length of a filter in the filter set that is smaller than the size of the line buffer for the P side or Q side that is outside of a currently being processed region.

In an embodiment, the method further includes determining whether to enable a strong filtering mode or a normal filtering mode, when it is determined to enable a strong filter mode, proceeding to the determining whether to apply the first filter set to reduce block artifacts at the block boundary.

In an embodiment, the first filter set is selected from a set of candidate filters that includes a filter having a filter length in a range from 1-tap to 16-tap.

In an embodiment, the first inter-side difference of the first line of the N lines of samples is determined based on one of:

$$|p_0 - q_0|,$$

$$(m \times |p_0 - q_1| + n \times |p_1 - q_0|)/(m+n),$$

$$|m \times (p_0 - q_1) + n \times (p_1 - q_0)|/(m+n),$$

$$(m \times |p_0 - q_0| + n \times |p_1 - q_1|)/(m+n), \text{ or}$$

$$|\Sigma_{s=0}^{len_p-1}(m_s \times p_s) - \Sigma_{t=0}^{len_q-1}(n_t \times q_t)|,$$

where m and n are integers, $\Sigma_s m_s = 1$, and $\Sigma_t n_t = 1$.

In an embodiment, the determining whether to apply the first filter set to reduce block artifacts at the block boundary further includes determining whether to apply the first filter set to reduce block artifacts at the block boundary according to one or more of:

reference picture difference between the P side and Q side,
motion vector difference between the P side and Q side,
prediction types of the P side and Q side,
residual difference between the P side and Q side,
color component of the N lines of samples, or
whether a picture, slice, or blocks at P side and Q side including the bock boundary is intra coded.

In an embodiment, the inter-side difference threshold and/or intra-side difference threshold is one of:

a value selected from values predefined for each quantization parameter (QP) used at the video coding system,
a value derived from threshold values tC and β,
a value selected from values predefined for each QP plus a picture level offset value,
a value indicated in a video parameter set (VPS), a sequence parameter set (SPS), a picture parameter set (PPS), a slice header, or a coding unit (CU), or
a just-noticeable-difference (JND) value calculated based on neighboring samples along the block boundary.

In one embodiment, the method further includes signaling a flag indicating whether to apply the first filter set, and signaling a length value indicating how many consecutive lines of the N lines of samples are to be filtered.

In an embodiment, the determining the filter length of the filter in the first filter set based on the first side length ($len_p$) and the second side length ($len_q$) includes determining the filter length of the filter that is to be applied at the P side, the filter length being in a range between 1 and $len_p$, or determining the filter length of the filter that is to be applied at the Q side, the filter length being in a range between 1 and $len_q$, where filter lengths of filters to be applied at the P side and the Q side are the same or different.

In an embodiment, the determining the filter length of the filter in the first set based on the first side length ($len_p$) and the second side length ($len_q$) includes determining the filter length of the filter to be applied at the P side to be a filter length assigned to a side length range that includes the first side length ($len_p$), or determining the filter length of the filter to be applied at the Q side to be a filter length assigned to a side length range that includes the second side length ($len_p$), wherein, for the P side or Q side, a side length range with a larger side length value is associated with a larger filter length than a side length range with a smaller side length value.

In an embodiment, the determining the filter length of the filter in the first set based on the first side length ($len_p$) and the second side length ($len_q$) includes determining a filter length for the P side or Q side based on the first side length ($len_p$), the second side length ($len_q$), and the first inter-side difference.

In an embodiment, the applying the at least one filter in the first filter set with the determined filter length on the block boundary includes applying the first filter set to a subset of samples at the P side or Q side to reduce block artifacts at the block boundary.

In an embodiment, the determining the filter length of the filter in the first set based on the first side length ($len_p$) and the second side length ($len_q$) includes determining a first filter tap length for the P side and a second filter tap length for the Q side according to a look-up table that specifies a pair of filter tap lengths for the P side and Q side, respectively, for each combination of a possible side length of the Q side and a possible side length of the P side of the block boundary.

Aspects of the disclosure provide an apparatus for deblocking filtering. The apparatus can include circuitry configured to receive reconstructed video data associated with a block boundary between coding blocks, the block boundary having N lines of samples crossing the block boundary from a P side of the boundary to a Q side of the boundary, determine whether to apply a first filter set to reduce block artifacts at the block boundary based on whether a first inter-side difference of a first line of the N lines of samples is greater than an inter-side difference threshold, the first inter-side difference indicating a sample value difference between the P side and the Q side of the block boundary, determine a filter length of a filter in the first filter set based on a first side length ($len_p$) of samples in each line of samples at the P side, and a second side length ($len_q$) of samples in each line of samples at the Q side when it is determined to apply the first filter set at the block boundary, and apply at least one filter in the first filter set with the determined filter length on the block boundary.

Aspects of the disclosure provide a non-transitory computer-readable medium storing instructions that, when executed by processing circuitry, cause to the processing circuitry to perform the deblocking filtering method.

BRIEF DESCRIPTION OF THE DRAWINGS

Various embodiments of this disclosure that are proposed as examples will be described in detail with reference to the following figures, wherein like numerals reference like elements, and wherein:

FIG. 5 shows a table illustrating different bound strength (Bs) values derived corresponding to different conditions of the coding parameters.

DETAILED DESCRIPTION OF EMBODIMENTS

I. Video Encoder and Decoder with a Deblocking Filter

Figure 1:
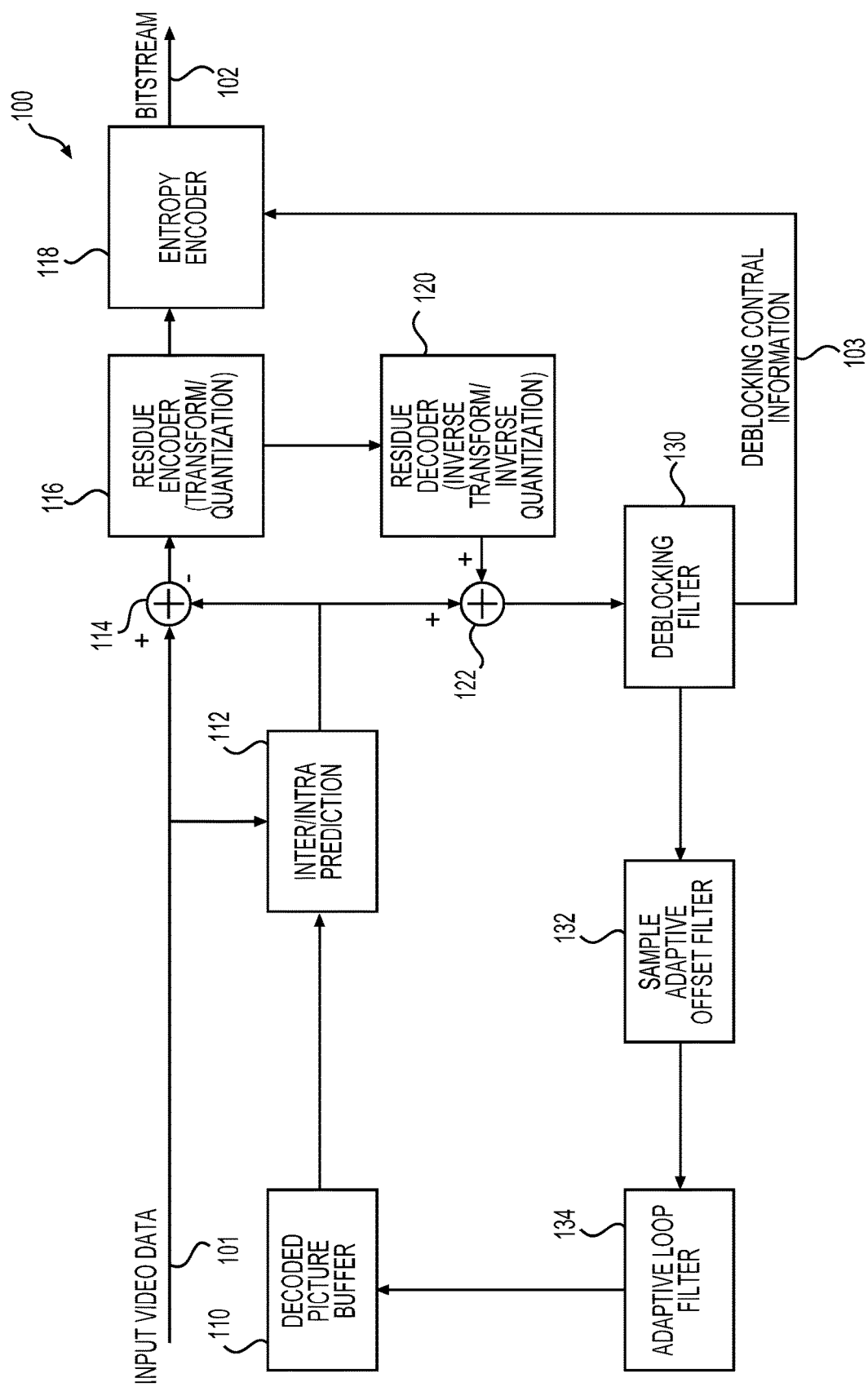
FIG. 1 shows an encoder with a deblocking filer according to an embodiment of the disclosure.

FIG. 1 shows an encoder 100 with a deblocking filer 130 according to an embodiment of the disclosure. The encoder 100 can include a decoded picture buffer 110, an inter-intra prediction module 112, a first adder 114, a residue encoder 116, an entropy encoder 118, a residue decoder 120, a second adder 122, and one or more in-loop filters, such as the deblocking filter 130, a sample adaptive offset filter (SAO) 132, and an adaptive loop filter (ALF) 134. Those components can be coupled together as shown in FIG. 1.

The encoder 100 receives input video data 101 and performs a video compression process to generate a bitstream 102 as an output. The input video data 101 can include a sequence of pictures. Each picture can include one or more color components, such as a luma component or a chroma component. The bitstream 102 can have a format compliant with a video coding standard, such as the Advanced Video Coding (AVC) standard, High Efficiency Video Coding (HEVC) standard, Versatile Video Coding (VVC) standard, and the like.

In various embodiments, the deblocking filter 130 can be configured to receive a reconstructed picture (or region), and adaptively apply a deblocking filtering operation to attenuate block artifacts in the reconstructed picture. For example, the deblocking filter 130 can employ a length-adaptive deblocking scheme to perform the deblocking processing on a block boundary between coding blocks. In one embodiment, when the length-adaptive deblocking scheme is employed, the deblocking filter 130 determines whether to apply a set of filters to the block boundary according to one or a combination of an inter-side difference between samples at opposite sides of the block boundary, an intra-side difference indicating smoothness of sample values, the continuity of discontinuities along the block boundary, the type of the block boundary, the color component of the samples to be filter, the prediction types of the coding blocks, the motion information of the coding blocks, the residual difference between the coding blocks, and other characteristics associated with the coding blocks. In one example, when the length-adaptive deblocking scheme is employed, the deblocking filter 130 determines whether to apply a set of filters to the block boundary according to the inter-side difference between samples at opposite sides of the block boundary. In another example, besides the inter-side difference, the deblocking filter 130 may further consider other factors when making the decision of whether to apply the set of filters. Examples of those factors can include an intra-side difference indicating smoothness of sample values (i.e. spatial activities of samples) at both sides of the block boundary, the number of consecutive lines of samples crossing the boundary satisfying certain constraints. In yet another example, when the length-adaptive deblocking scheme is employed, the deblocking filter 130 determines whether to apply a set of filters to the block boundary according to the number of consecutive lines of samples crossing the boundary satisfying certain predetermined constraints.

When it is determined to apply the set of filters, the deblocking filter 130 can adaptively determine filter lengths according to lengths of samples at the sides of the block boundary (side lengths). Additionally, whether the boundary is a region boundary can also be considered for selecting the suitable filters. For example, when one side of the boundary is outside a currently being processed region, a size of a line buffer is used to determine filter lengths of the set of filters.

The length-adaptive deblocking filtering scheme described herein can be combined with filtering decisions and operations defined in the HEVC standard to form a unified process. However, the present invention is not limited thereto, the length-adaptive deblocking filtering scheme described herein can be combined with filtering decisions and operations defined in other video coding standards.

In FIG. 1, the decoded picture buffer 110 stores reference pictures that are useful for motion estimation and motion compensation performed at the inter-intra prediction module 112. The inter-intra prediction module 112 performs inter picture prediction or intra picture prediction to determine a prediction for a block of a current picture during the video compression process. The prediction of the block is provided to the first and second adders 114 and 122. A current picture (a picture currently under processing) can be divided into multiple blocks with a same or different size for the inter or intra prediction operations.

The first adder 114 receives a prediction of a block from the inter-intra prediction module 112 and original pixels of the block from the input video data 101. The adder 114 then subtracts the prediction from the original pixel values of the block to obtain a residue of the block. The residue of the block is transmitted to the residue encoder 116.

The residue encoder 116 receives residues of blocks, and compresses the residues to generate compressed residues. For example, the residue encoder 116 may first apply a transform, such as a discrete cosine transform (DCT), discrete sine transform (DST), wavelet transform, and the like, to the received residues corresponding to a transform block and generate transform coefficients of the transform block. Partition of a picture into transform blocks can be the same as or different from partition of the picture into prediction blocks for inter-intra prediction processing.

Subsequently, the residue encoder 116 can quantize the coefficients to compress the residues. The quantization can be controlled with a quantization parameter (QP). A QP indicates a step size for associating the transform coefficients with a finite set of steps. A larger QP value represents bigger steps that crudely approximate the transform such that most of signals in the transform block can be captured by fewer coefficients, which may result in a lower bit rate. In contrast, a smaller QP value can more accurately approximate the transform, however, at a cost of increased bit number for encoding the residues. Generally, a larger QP can induce more distortion or compression noise into a reconstructed picture resulted from the video compression process, and lead to heavy blocking artifacts. Accordingly, a stronger deblocking filter may potentially be selected to filter a boundary associated with a larger QP. The compressed residues (quantized transform coefficients) are transmitted to the residue decoder 120 and the entropy encoder 118.

The residue decoder 120 receives the compressed residues and performs an inverse process of the quantization and transformation operations performed at the residue encoder 116 to reconstruct residues of a transform block. Due to the quantization operation, the reconstructed residues are similar to the original residues generated from the adder 114 but typically are not the same as the original version.

The second adder 122 receives predictions of blocks from the inter-intra prediction module 112 and reconstructed residues of transform blocks from the residue decoder 120. The second adder 122 subsequently combines the reconstructed residues with the received predictions corresponding to a same region in the picture to generate reconstructed video data. The reconstructed video data can then, for example, be transferred to the deblocking filter 130.

In one example, the deblocking filter 130 applies a set of low-pass filters to block boundaries to reduce blocking artifacts. The filters can be applied based on characteristics of reconstructed samples on both sides of block boundaries in a reconstructed picture as well as coding parameters (intra or inter coding modes, MVs, and QPs) determined at the inter-intra prediction module 112 or the residue encoder 116. The deblocked reconstructed video data can then be provided to the SAO 132. In addition, in some examples, deblocking control information 103 may be generated at the deblocking filter 130 and transmitted to the entropy encoder 118. For example, the deblocking control information 103 may include flags indicating whether a certain set of filters would be applied for certain pictures, picture regions (e.g., slice, coding tree unit (CTU)), or coding blocks. The deblocking control information 103 may include deblocking related parameters associated with certain pictures, picture regions, or coding blocks.

In one example, the SAO 132 receives the deblocked reconstructed video data and categorizes pixels in the reconstructed video data into groups. The SAO 132 can then determine an intensity shift (offset value) for each group to compensate intensity shifts of each group. The shifted reconstructed video data can then be provided from the SAO 132 to the ALF 134. In one example, the ALF 134 is configured to apply a filter to reconstructed video data to reduce coding artifacts in the temporal domain. For example, the ALF 134 selects a filter from a set of filter candidates and applies the elected filter to a region of the reconstructed video data. In addition, the ALF 134 can be selectively turned on or off for each block of the reconstructed video data. The processed reconstructed video data can then be transmitted to the decoded picture buffer 110.

The entropy encoder 118 receives the compressed residues from the residue encoder 116 and deblocking control information 103 from the deblocking filter 130. The entropy encoder 118 may also receive other parameters and/or control information, such as intra prediction mode information, motion information, quantization parameters, and the like. The entropy encoder 118 encodes the received parameters or other information to form the bitstream 102. The bitstream 102 including data in a compressed format can be transmitted to a decoder via a communication network, or transmitted to a storage device (e.g., a non-transitory computer-readable medium) where video data carried by the bitstream 102 can be stored.

Figure 2:
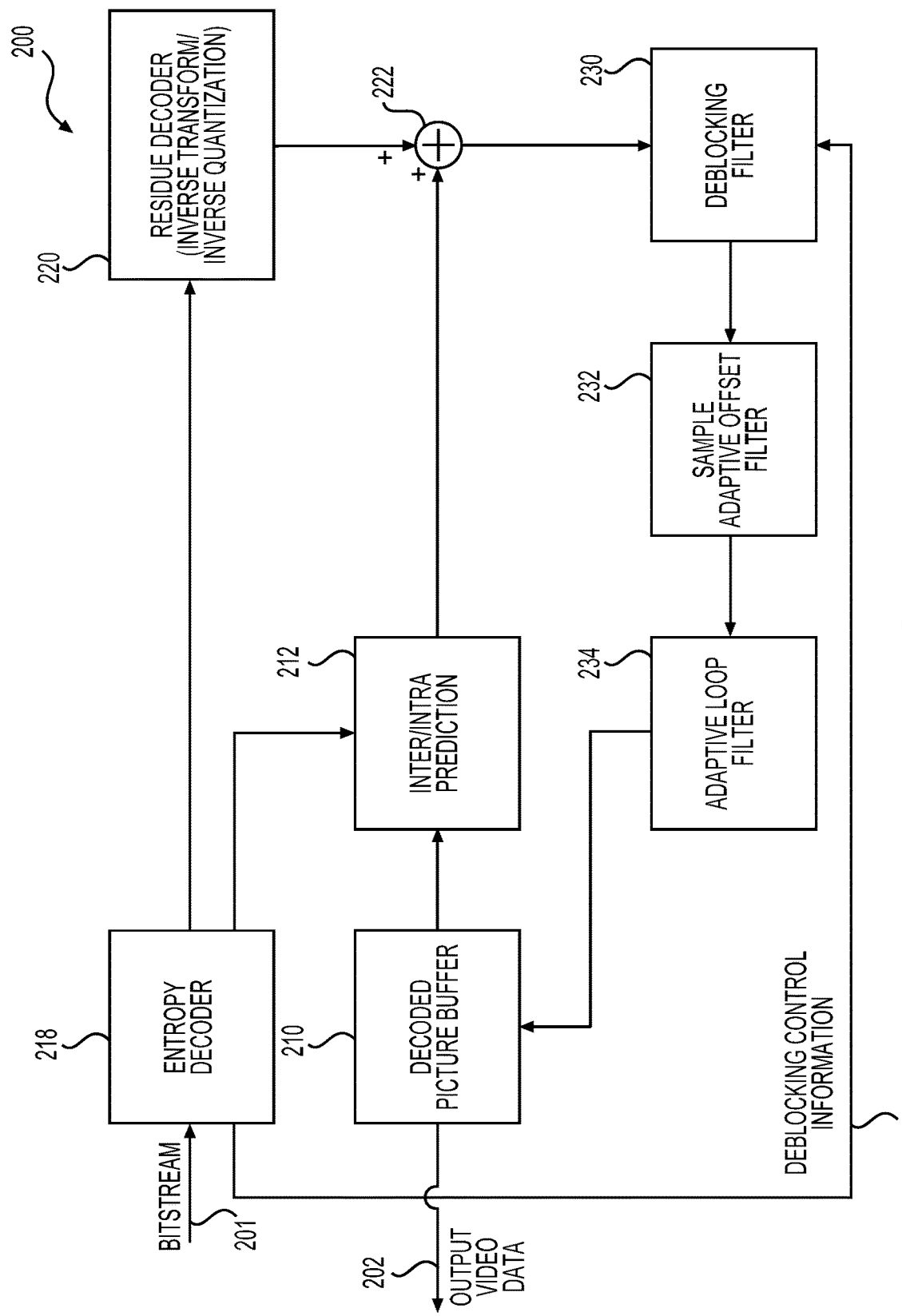
FIG. 2 shows a decoder according to an embodiment of the disclosure.

FIG. 2 shows a decoder 200 according to an embodiment of the disclosure. The decoder 200 includes an entropy decoder 218, a residue decoder 220, a decoded picture buffer 210, an inter-intra prediction module 212, an adder 222, and one or more in-loop filters, such as a deblocking filter 230, an SAO 232, and an ALF 234. Those components are coupled together as shown in FIG. 2. In one example, the decoder 200 receives a bitstream 201 generated by an encoder, such as the bitstream 102 generated by the encoder 100, and performs a decompression process to generate output video data 202. The output video data 202 can include a sequence of pictures that can be displayed, for example, on a display device, such as a monitor, a touch screen, and the like.

Similar to the encoder 100 in FIG. 1 example, the decoder 200 receives reconstructed video data and employs the deblocking filter 230 to attenuate block artifacts in a reconstructed picture or region. The deblocking filter 230 similarly uses the length-adaptive deblocking filtering scheme described herein to perform deblocking processing. Different from the deblocking filter 130, the deblocking filter 230 may receive deblocking control information 203 generated at the encoder side, and accordingly carry out the deblocking operations.

The entropy decoder 218 receives the bitstream 201 and performs a decoding process which is an inverse process of the encoding process performed by the entropy encoder 118 in FIG. 1 example. As a result, compressed residues, prediction parameters (intra mode information, and motion information), deblocking control information 203, and the like, are obtained. The compressed resides are provided to the residue decoder 220, and the prediction parameters are provided to the inter-intra prediction module 212. The inter-intra prediction module 212 generates predictions of blocks of a picture based on the received prediction parameters, and provides the predictions to the adder 222. The decoded picture buffer 210 stores reference pictures useful for motion compensation performed at the inter-intra prediction module 212. The reference pictures, for example, can be received from the ALF 234. In addition, reference pictures are obtained from the decoded picture buffer 210 and included in the picture video data 202 for displaying to a display device.

The residue decoder 220, the adder 222, the deblocking filter 230, the SAO 232, and the ALF 234 are similar to the residue decoder 120, the second adder 122, the deblocking filter 130, the SAO 132, and the ALF 134 in terms of functions and structures. Description of those components is omitted.

The employment of a deblocking filter, such as the deblocking filter 130 and 230, in a decoder or encoder reduces block artifacts in reconstructed video data, resulting in high quality output pictures. In addition, when those high quality pictures are used as reference pictures for encoding succeeding pictures, bit rate for transmission of the compressed pictures can be decreased. Therefore, deblocking techniques disclosed herein for improving performance of a deblocking filter can improve performance and capability of a decoder or encoder which includes the deblocking filter.

While the FIG. 1 and FIG. 2 examples show a series of filters 130, 132, and 134, or 230, 232, and 234, that are included in the encoder 100 or decoder 200, it is noted that none or fewer of such filters can be included in an encoder or decoder in other embodiments. In addition, the position of the deblocking filter 230 with respect to other filters can be different from what is shown in the FIG. 1 or FIG. 2 examples.

In various embodiments, the deblocking filter 130 or 230 can be implemented with hardware, software, or combination thereof. For example, the deblocking filter 130 or 230 can be implemented with one or more integrated circuits (ICs), such as an application specific integrated circuit (ASIC), field programmable gate array (FPGA), and the like. For another example, the deblocking filter 130 or 230 can be implemented as software or firmware including instructions stored in a computer readable non-transitory storage media. The instructions, when executed by a processing circuit, causing the processing circuit to perform functions of the deblocking filter 130 or 230.

It is noted that the deblocking filter 130 or 230 implementing the deblocking techniques disclosed herein can be included in other decoders or encoders that may have similar or different structures from what is shown in FIG. 1 or FIG. 2. In addition, the encoder 100 and decoder 200 can be included in a same device, or separate devices in various examples.

II. Deblocking Filter in HEVC

HEVC employs block-based prediction and transform coding. For example, HEVC divides a picture into coding tree units (CTU) of 16×16, 32×32 or 64×64 samples. The CTUs can be further divided into inter or intra prediction units, or transform units with varied sizes, such as 4×4, 4×8, 8×4, 32×32, or 64×64 samples. Discontinuities can occur in the reconstructed data (or signal) at the block boundaries. For example, block transform coding of prediction residues followed by coarse quantization may cause discontinuities at the block boundaries of transform blocks. For inter coded blocks, predictions for adjacent blocks in the current picture may not come from adjacent blocks in previously coded pictures, which may create discontinuities at the block boundaries of prediction units. For intra coded blocks, different prediction processes may be used for adjacent blocks, which similarly cause discontinuities at the block boundaries of the prediction units.

Blocking artifacts can be noticed by the human vision system when the signal on both sides of a block boundary is relative smooth, but more difficult to notice when the signal has a high variation. In addition, if original signal across the block boundary has a characteristic of high variation, it is difficult to say whether changes in in reconstructed signal across the block boundary are caused by coding or belong to the original signal.

Therefore, a deblocking filter be configured to make filtering decisions according to characteristics of reconstructed sample values on both side of a block boundary, as well as certain coding parameters (e.g., inter or intro mode, motion vectors, QPs, and the like). The coding parameters indicate how likely the block artifacts are created by a respective coding process. The filtering decisions can include whether to filter a particular boundary, what filtering strength to be applied, whether a certain filter set is to be used, and the like.

In HEVC, a picture or a region of a picture is divided by a grid into blocks of 8×8 samples. Block boundaries of coding units, prediction units or transform units on the 8×8 grid are processed with deblocking processing. In addition, a boundary to be processed is divided into multiple non-overlapped 4-sample segments, and a segment is the unit that the deblocking filtering is applied.

Figure 3A:
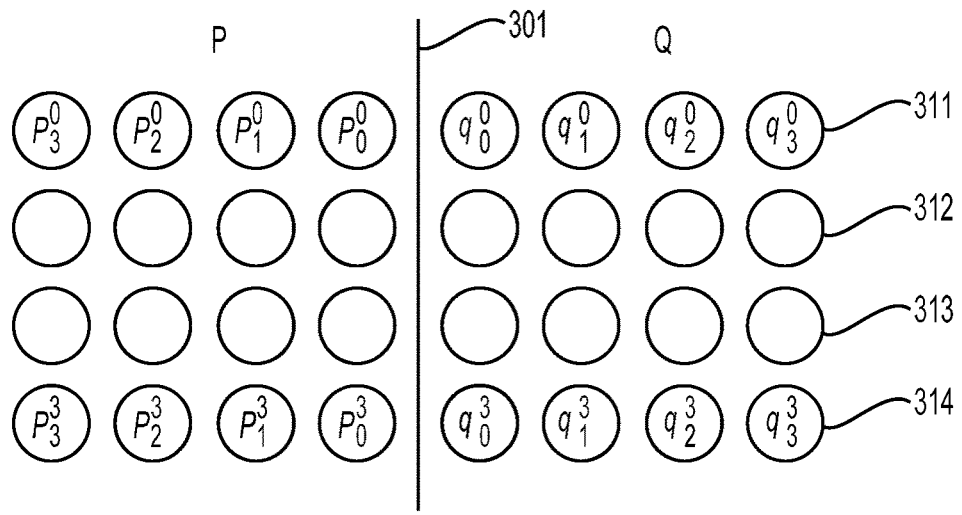
FIG. 3A shows a vertical block boundary having a 4-sample length.
Figure 3B:
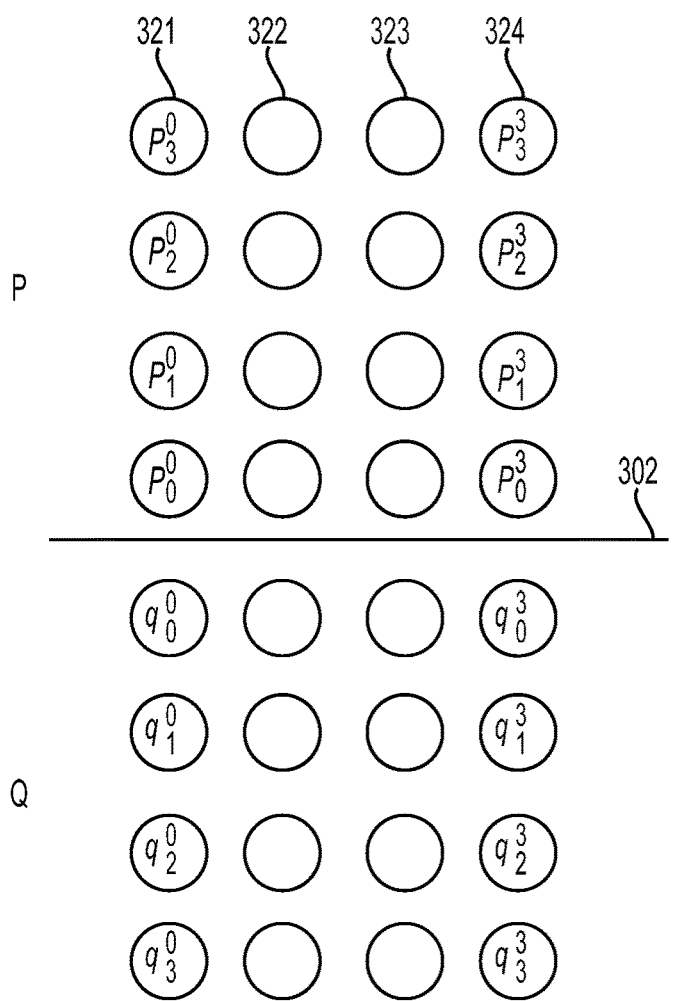
FIG. 3B shows a horizontal block boundary having a 4-sample length.

FIG. 3A shows a vertical block boundary 301 having a 4-sample length. FIG. 3B shows a horizontal block boundary 302 having a 4-sample length. As shown, four rows of samples 311-314 are perpendicular to and cross the vertical block boundary 301, while four columns of samples 311-314 are perpendicular to and cross the horizontal block boundary 301. Each of the above rows or columns of the samples is referred to as a line of sample. In addition, the left side of the vertical block boundary 301 or upper side of the horizontal block boundary 302 is referred to as a P side, while the right side of the vertical block boundary 301 or lower side of the horizontal block boundary 302 is referred to as a Q side.

A sample value can be represented as $p_k^i$ (or $p_{i,k}$), or $q_k^i$ (or $q_{i,k}$) for samples at the P side and Q side respectively where i is an index of a line of samples, while k indicates a position of a sample in a line of samples at Q or P side.

Figure 4:
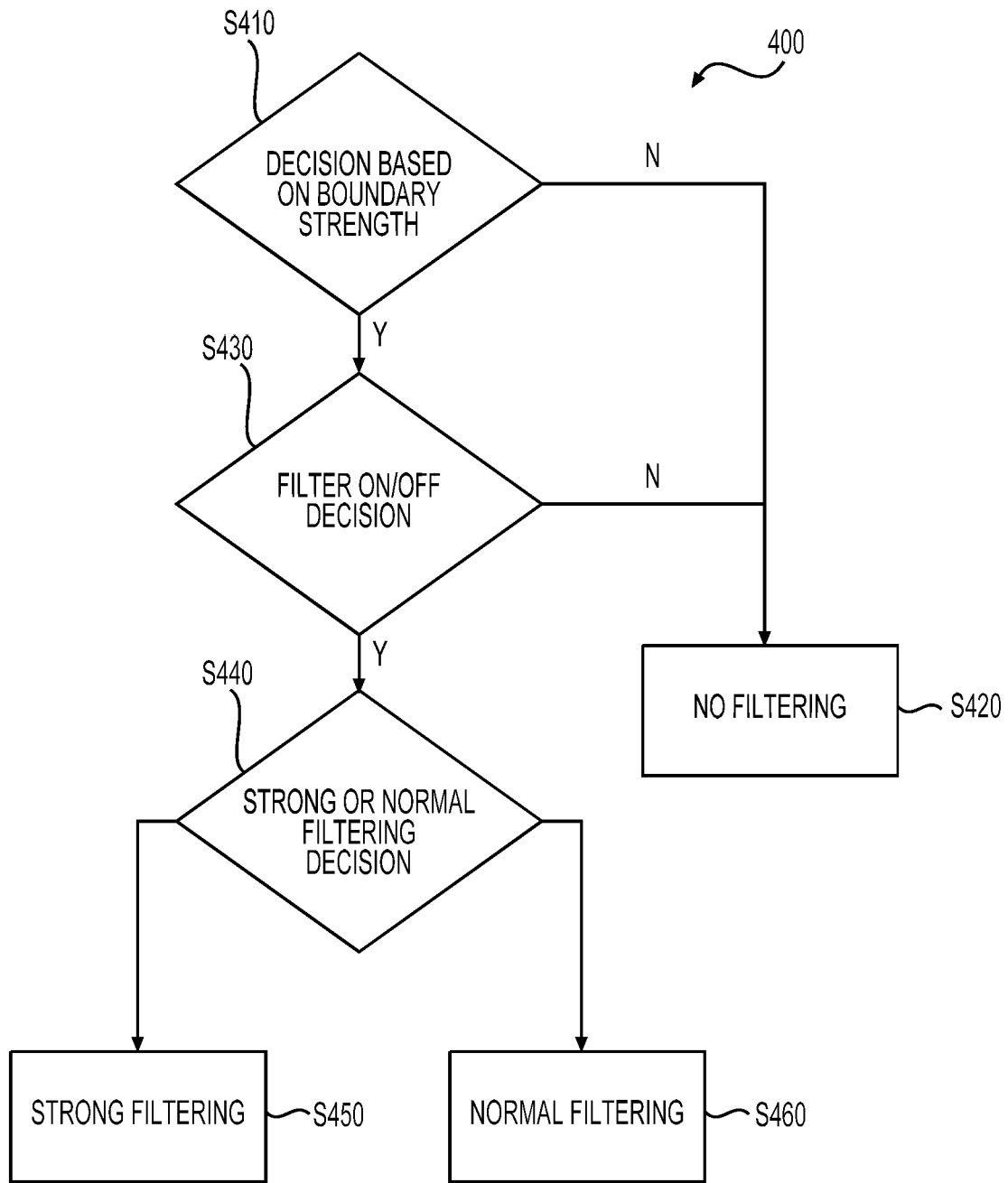
FIG. 4 shows an example of deblocking filtering decision making process according to the High Efficiency Video Coding (HEVC) standard.

FIG. 4 shows an example of deblocking filtering decision making process 400 according to the HEVC standard. At S410, a decision of whether to apply deblocking filtering to a particular block boundary is determined based on a boundary strength (Bs) variable. The Bs can be derived according to coding parameters (e.g., prediction types and motion vectors) associated with the block boundary. FIG. 5 shows a table illustrating different Bs values derived corresponding to different conditions of the coding parameters.

When the Bs is greater than zero for luma component, or greater than 1 for chroma component, the deblocking is to be applied to the block boundary. Otherwise, no deblocking is applied (S420). For the luma block boundary, additional conditions are further evaluated to determine whether to apply the deblocking (S430). For chroma block boundary, no further evaluation is performed.

At S430, a filter on/off decision is made according to characteristics of samples on both sides of the block boundary. In one example, the deblocking is applied when the following condition is satisfied:

$$|p_{2,0}-2p_{1,0}+p_{0,0}|+|p_{2,3}-2p_{1,3}+p_{0,3}|+|q_{2,0}-2q_{1,0}+q_{0,0}|+|q_{2,3}-2q_{1,3}+q_{0,3}|<\beta \quad (1)$$

where the filtering threshold $\beta$ depends on the QP and can be derived from a look-up table. When condition (1) is not satisfied, the deblocking is not applied (S420). The expression (1) is used to check how much the signal on each side of the block boundary deviates from a straight line (ramp). Or, in other words, the expression (1) is used to evaluate whether the signal at the sides of the block boundary is smooth (i.e. if the signal is flat or has a shape of an inclined plane (ramp)).

At S440, a decision whether to enable a strong or normal filtering mode is determined based on characteristics of signal at both sides of the block boundary with another set of conditions. The strong filtering is applied (S450) (i.e., the strong filtering mode is enabled) if the following three conditions are satisfied:

$$|p_{2,i}-2p_{1,i}+p_{0,i}|+|q_{2,i}-2q_{1,i}+q_{0,3}|<\beta/8 \quad (2)$$

$$|p_{3,i}-p_{0,i}|+|q_{0,i}-q_{3,i}|<\beta/8 \quad (3)$$

$$|p_{0,i}-q_{0,i}|<2.5t_C \quad (4)$$

where the threshold $t_C$ is a clipping parameter. When either one of the conditions (2), (3) and (4) is not satisfied, the normal blocking is applied (S460) (i.e., the normal filtering mode is enabled). The expression (4) makes sure that the step between the sample values at the side of the block boundary is small, while the expressions (2) and (3) verifies that the signal on both sides is flat in two different ways.

As can be seen, three levels of filtering strength are offered in the process 400: strong, normal, or zero (e.g., no filtering), corresponding to increasing levels of local activities. For strong filtering, 3 samples at the P side and Q side are filtered. For normal filtering, 2 samples at the P side and Q side are filtered. Five predefined 4- or 5-tap filters are assigned to the 3 samples in strong filtering and 2 samples in the normal filtering, respectively.

The deblocking threshold $\beta$ and the clipping threshold $t_C$ depend on an average QP value of two neighboring blocks at opposite sides of a block boundary, and are typically stored in corresponding tables. The clipping threshold $t_C$ may also depends on the Bs value. The parameter $\beta$ controls which block boundaries are filtered, and controls the selection between the normal and strong filters. The higher the QP value, the larger the parameter $\beta$, and the more frequently the block boundary may be filtered. The clipping parameter $t_C$ controls the selection between the normal and the storing filters, and determines a maximum absolute value of modifications that are allowed for changing pixel values in the deblocking filtering.

III. Length-Adaptive Deblocking Filter

The length-adaptive deblocking scheme can adaptively selects a filter set from a set of candidate filters to smooth block boundaries in a reconstructed picture based on at least one of the predetermined factors. The predetermined factors can include the inter-side difference between the Q side and the P side, the intra-side difference of both the Q side and P side, side lengths of both the Q side and P side, the continuity of discontinuities along the block boundary, and the like.

The set of candidate filters can include filters with various filter tap lengths. The tap length of a filter refers to the number of sample values used as input to the respective filter. For example, the set of candidate filters can include filters having a filter length from 1-tap to 16-tap or more, such as 1-tap, 2-tap, 3-tap, 4 tap, 8-tap, 16 tap, and the like. Compared with filters specified in the HEVC standard, members of the set of candidate filters may have a longer tap length, thus, such set of candidate filters is referred to as a set of long filters. The filter set selected from the set of long filters based on the length-adaptive deblocking scheme can be referred to as a long filter set. The filters in the selected filter set can be applied to lines of samples neighboring the respective block boundary. For example, each filter in the selected filter set can correspond to a sample in a line of samples at the sides of the block boundary, and output of each filter can be used to replace the respective original sample value.

The length-adaptive deblocking scheme can be combined with deblocking filtering decisions and operations defined in the HEVC standard to form a unified deblocking filtering process. For example, a deblocking filter may first determine whether a strong filter is to be used. When a strong filtering decision is made, a process implementing the length-adaptive deblocking scheme can be performed to determine whether a long filter set selected from the set of candidate long filters can be applied. When it is determined that the long filter set is not to be used, a strong filtering operation as specified in HEVC can be performed.

III. 1 Filtering Decision Based on Inter-Side Difference

Figure 6:
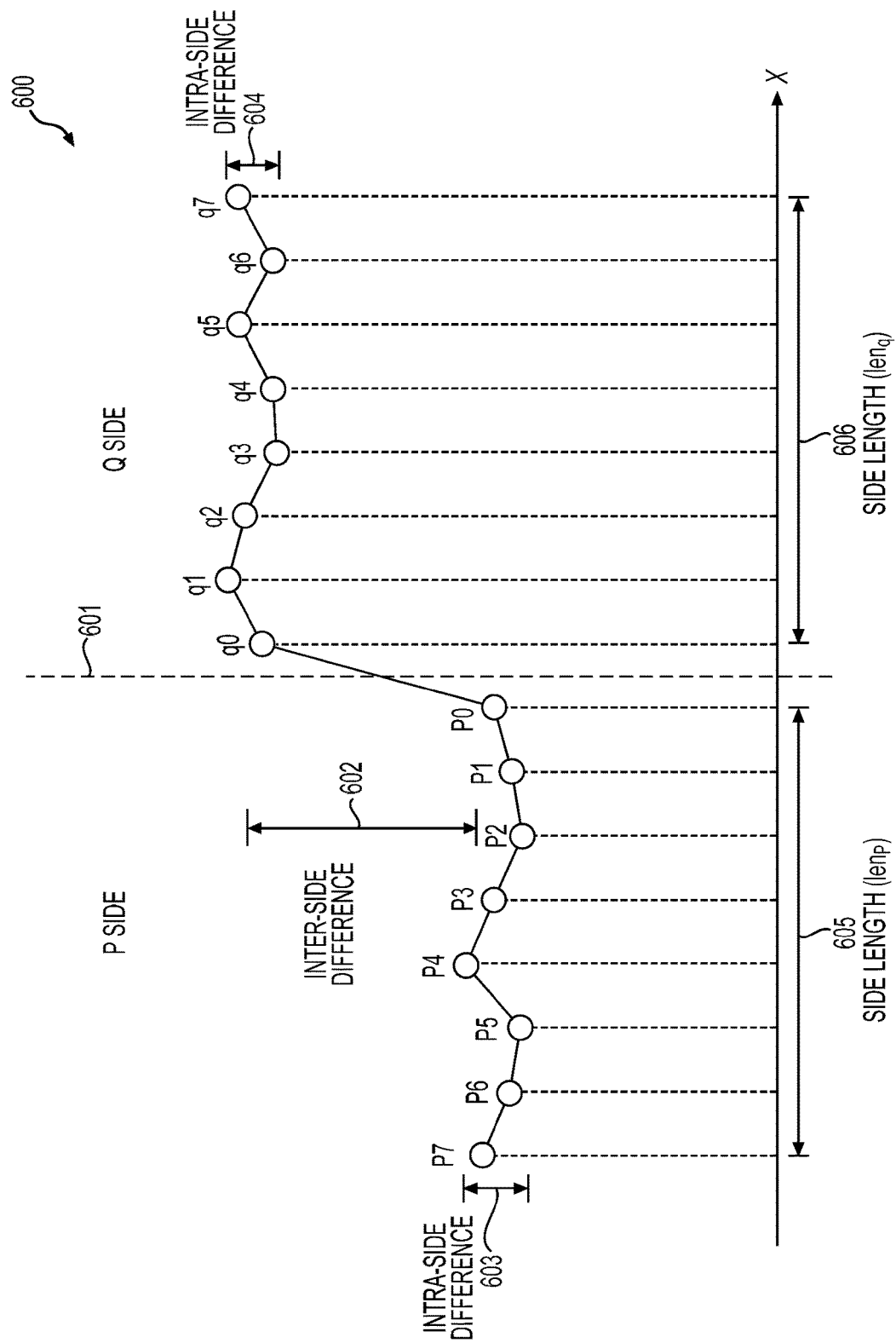
FIG. 6 shows a sequence of sample values of a line of samples crossing a block boundary in a reconstructed picture.

FIG. 6 shows a sequence of sample values of a line of samples 600 crossing a block boundary 601 in a reconstructed picture. The block boundary 601 under processing may have a length of 4 samples, 6 samples, 8 samples, 16 samples, or the like. Thus, there may be multiple lines of samples perpendicular to and crossing the block boundary 601. The line of samples 600 may be the i-th line of samples crossing the block boundary 601. The line of samples 600 includes a first set of samples, p0-p7, at the P side of the block boundary 601, and a second set of samples, q0-q7, at the Q side of the block boundary.

In one example, a sub-set of samples at the sides of the block boundary 601 are selected to derive an inter-side difference (also referred to as a gap value) 602. The inter-side difference represents a sample value difference between the samples at the P side and Q side of the block boundary 601. The inter-side difference 602 can indicate the smoothness of the signal at the sides of the block boundary 601, or a level of a discontinuity between the P side and the Q side.

Based on the inter-side difference 602, a decision whether to filter the block boundary 601 with a long filter set can be made. For example, when the inter-side difference 602 is greater than an inter-side difference threshold (or gap value threshold), gap_th, it can be determined that the long filter set is to be used.

In one example, inter-side differences of multiple lines of samples of the block boundary 601 may be evaluated to determine whether to apply the long filter set to the block boundary 601. For example, the first and last lines of samples may be evaluated. When respective inter-side differences of both the first and last lines of samples are greater than the inter-side difference threshold, gap_th, the long filter set can be applied.

In various embodiments, the inter-side difference 602 may be derived in different ways. Below are some examples of deriving the inter-side difference 602:

$$|p_0-q_0|, \qquad (5)$$

$$(m \times |p_0-q_1|+n \times |p_1-q_0|)/(m+n), \qquad (6)$$

$$|m \times (p_0-q_1)+n \times (p_1-q_0)|/(m+n), \qquad (7)$$

$$(m \times |p_0-q_0|+n \times |p_1-q_1|)/(m+n), \text{ or} \qquad (8)$$

$$|\Sigma_{s=0}^{len_p-1}(m_s \times p_s)-\Sigma_{t=0}^{len_q-1}(n_t \times q_t)|, \qquad (9)$$

where m and n are integers, $\Sigma_s m_s=1$, $\Sigma_t n_t=1$, and $p_k$ or $q_k$ (k=0, 1, s, or t) represents a sample value with the line index being omitted. In addition, $len_p$ and $len_q$ represent side lengths 605 and 606 of the P side and Q side of the block boundary 601, respectively.

A side length of a block boundary corresponding to the P side or Q side refers to a number of samples in each line of samples at the P side or Q side. In one example, for a vertical block boundary, the P side length, $len_p$, equals to a width of a block that is adjacent to and at the P side of the vertical block boundary. The block includes the lines of samples at the P side of the block boundary. Similarly, for the vertical block boundary, the Q side length, $len_q$, equals to a width of a block that is adjacent to and at the Q side of the vertical block boundary. The block includes the lines of samples at the Q side of the block boundary may be included in the block. For a horizontal block boundary, similarly, a side length, $len_p$ or $len_q$ can be a height of a block adjacent to the horizontal block boundary.

In FIG. 6 examples, the side lengths of P side and Q side, $len_p$ and $len_q$, 605 and 606, are shown to be equal to each other. However, in other examples, side lengths of P side and Q side, $len_p$ and $len_q$, 605 and 606, can be different. For example, the blocks at opposite side of a block boundary may have different width or height. Accordingly, the side lengths of Q side and P side may take different values.

In various embodiments, the inter-side difference threshold, gap_th, can be a predefined value, derived from neighboring samples (pixels) along the block boundary 601, or explicitly indicated to a decoder.

In one example, a lookup table is used to store predefined inter-side difference threshold values corresponding to each QP. For example, the following sequence of inter-side difference threshold values can be stored in the lookup table corresponding to a sequence of QPs from the lowest to the highest:
[16, 16, 16, 16, 16, 16, 16, 16, 16, 16, 16, 16, 16, 16, 16, 16, 16, 16, 16, 16, 16, 16, 16, 16, 16, 16, 16, 16, 14, 12, 10, 8, 8, 7, 7, 7, 7, 7, 5, 5, 5, 5, 5, 5, 5, 5, 5, 5, 5, 5, 5]. In some examples, the slice/tile/picture level QP values is used to find the inter-side difference threshold. Or, two blocks at the opposite sides of the block boundary may have different QPs. An average of these two QPs may be used to search the lookup table.

In one example, when inter-side difference threshold values are predefined for each QP, an inter-side difference threshold value offset can be employed to refine or control the selection of the inter-side difference threshold value on sequence, picture, or slice basis. For example, the inter-side difference threshold value offset can be carried in the slice header, picture parameter set (PPS), or sequence parameter set (SPS) to control the selection of the inter-side difference threshold value. For example, if the inter-side difference threshold for each QP is {$gap\_th^0$, $gap\_th^1$, ..., $gap\_th^m$, ..., $gap\_th^M$}, and the current QP is m and the inter-side difference offset value is set to n, then the inter-side difference threshold is selected as $gap\_th^{min(M,max(0,m+n))}$.

In one example, an inter-side difference threshold value is derived from other related threshold values, such as the threshold values $t_C$ and $\beta$. In one example, a set of threshold values may be explicitly indicated to a decoder, for example, in video parameter set (VPS), SPS, PPS, slice header, or a coding unit (CU). In one example, adjoining or neighboring pixels along the block boundary are used to derive a visual Just-Noticeable-Difference (JND) value that is used as an inter-side difference threshold value for deblocking the block boundary.

In addition to the inter-side difference of the block boundary 602, other factors can be considered in combination to make the filtering decision of selecting a long filter set for deblocking the block boundary 602 in some embodiments. Those factors can include the reference pictures of two blocks adjacent to and at opposite sides of the block boundary 602, the motion vector difference of the two blocks, the predictions of the two blocks, or residuals of the two blocks. For example, when the inter-side difference 602 is greater than an inter-side difference threshold, the reference pictures of both sides of the block boundary 602 are different, and the residuals of both sides also exceed a threshold, the long filter set would be applied. Otherwise, the long filter set would not be applied.

In one embodiment, corresponding to different inter-side difference threshold values, for example, corresponding to different QP, different long tap filter sets may be configured. Accordingly, when the inter-side difference 602 is evaluated based on a certain inter-side difference threshold, $gap\_th_j$, a j-th long filter set will be selected for deblocking the block boundary 601.

III. 2 Filtering Decision Based on Intra-Side Difference

In some embodiments, as shown in FIG. 6, intra-side differences 603 and 604 of the Q and P sides of the block boundary 601 are considered solely or in addition to some other factors like the inter-side difference 602 to make the filtering decisions. The intra-side difference 603 or 604 of the Q or P side is a metric for measuring a variation of sample values in either side of the block boundary. The intra-side difference can also be referred to as a selfsimilarity metric indicating in what degree the set of samples are similar to each other. In one example, the intra-side difference 603 or 604 is calculated as an aggregation of differences of a subset of samples at the P or Q side with respect to a designated sample at the P side or the Q side, respectively.

In some examples, a combination of the intra-side differences 603 and 604 of both sides of the block boundary 601 are used to make a filtering decision. The combination of the intra-side differences 603 and 604 is referred to as an intra-side difference of the block boundary 601. For example, a filter may first evaluate inter-side differences of one or more lines of samples of the block boundary 601, and subsequently evaluate the combined intra-side difference of the block boundary 601, for example, by comparing the combined intra-side difference with a threshold, referred to as an intra-side difference threshold, denoted as ss_th. If the intra-side difference is smaller than the intra-side difference threshold, a long filter set can be applied (or further evaluations may be performed before a final decision can be made). Otherwise, no long filter set would be selected. In other examples, intra-side differences of multiple lines of samples of the block boundary 601 may be evaluated to make the filtering decision instead of only one line of samples being evaluated.

Figure 7:
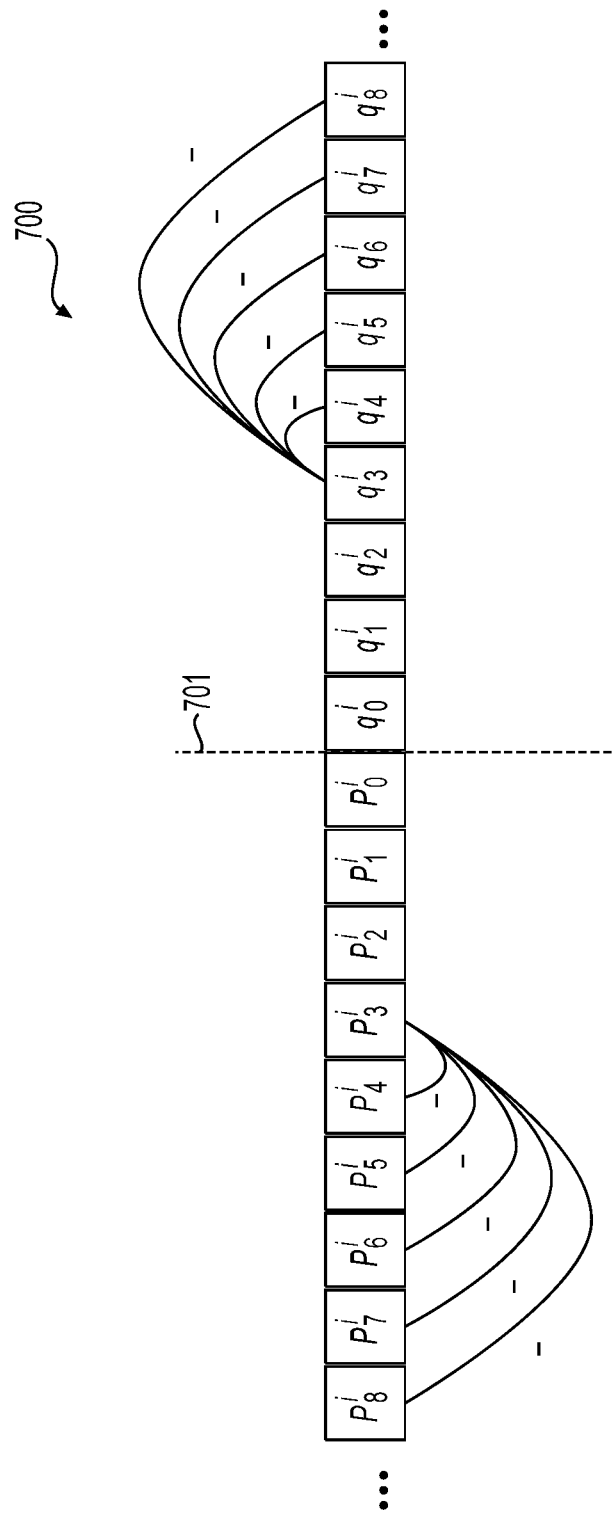
FIG. 7 shows an example of making a filtering decision based on an intra-side difference according to an embodiment of the disclosure.

FIG. 7 shows an example of making a filtering decision based on an intra-side difference according to an embodiment of the disclosure. A line of samples 700 crossing a block boundary 701 is shown. Side lengths, $len_p$ and $len_q$, of a P or Q side of the block boundary 701 are both 16. A intra-side difference constraint shown below can be examined to determine whether to apply a 16-tap filter set:

$$\Sigma_{s=4}^{8}|p_s^i-p_3^i|+\Sigma_{t=4}^{8}|q_t^i-q_3^i|<ss\_th \qquad (10)$$

where i is a line index number of the line of samples 700, and ss_th is an intra-side difference threshold corresponding to the 16-sample side length of both sides of the block boundary 701. In the expression (10), the combined intra-side difference is defined to be an aggregation of the differences of a subset of samples at the P side with respect to the sample p3, and the differences of a subset of samples at the Q side with respect to the sample q3 at the Q side. When the above intra-side difference constraint (10) is satisfied, a 16-tap filter set can be used for processing the 8 samples at either side of the block boundary 701.

In one embodiment, an intra-side difference constraint represented in a more general way is used:

$$\Sigma_{s=0}^{len_p-1}(m_s\times|p_s-p_x^i|)+\Sigma_{t=0}^{len_q-1}(n_t\times|q_t^i-q_y^i|)<ss\_th_j, \qquad (11)$$

where $0<x<len_p-1$, $0<y<len_q-1$, $m_s$ can be 0 or 1, and $n_t$ can be 0 or 1. When the expression (11) is satisfied, a j-th set of long filters corresponding to the intra-side difference threshold, $ss\_th_j$, may be applied.

Similar to the inter-side difference threshold, in various embodiments, the intra-side difference threshold, ss_th, can be a predefined value, derived from neighboring samples (pixels) along the block boundary 601, or explicitly indicated to a decoder.

In one example, a lookup table is used to store predefined intra-side difference threshold values corresponding to each QP. In one example, when intra-side difference threshold values are predefined for each QP, an intra-side difference threshold value offset can be employed to refine or control the selection of the intra-side difference threshold value on sequence, picture, or slice basis.

In one example, an intra-side difference threshold value is derived from other related threshold values, such as the threshold values $t_C$ and $\beta$. In one example, a set of intra-side difference threshold values may be explicitly indicated to a decoder, for example, in video parameter set (VPS), SPS, PPS, slice header, or a coding unit (CU). In one example, adjoining or neighboring pixels along the block boundary are used to derive a visual Just-Noticeable-Difference (JND) value that is used as an intra-side difference threshold value for deblocking the block boundary.

III. 3 Filtering Decision Based on Continuity of Discontinuities Along a Block Boundary In some embodiments, a filtering decision is based on the number of consecutive lines of samples crossing a block boundary each line of which satisfies a set of filtering conditions (or constraints). For example, the set of filtering conditions can include an inter-side difference is greater than an inter-side difference threshold, and/or an intra-side difference is smaller than an intra-side difference threshold, or other conditions.

For example, a block boundary has N lines of samples. When K, or more than K, consecutive lines of samples each satisfy a set of conditions, a deblocking filter set will be applied to the N lines of samples or a subset of N lines of samples. K (as a similarity threshold) can be a value from 2 to N. In contrast, if D consecutive lines of samples satisfy the set of conditions, but D is smaller than the threshold, K, the deblocking filter set will not be applied.

III. 4 Filtering Decisions Based on Other Factors

In an embodiment, whether to apply a deblocking filter set is determined based on color component. For example, a long filter set is applied to luma component but not to chroma component. Or, to the contrary, a long filter set is applied to chroma component but not to luma component.

In an embodiment, whether to apply a deblocking filter set is determined based on if a picture, slice, or the blocks at P side or Q side is intra coded or not. For example, when the picture or slice is intra coded, the deblocking filter set will be applied to block boundaries in the picture or the slice. In one embodiment, a de-blocking filter set is only applied to non-intra coded picture or slice.

In an embodiment, whether to enable a set of deblocking filters can be explicitly indicated in VPS, SPS, PPS, slice header, CU, or the like. For example, when it is explicitly indicated in a bit stream that a deblocking filter set is enabled, a series of filtering decisions regarding whether to apply the filter set will be performed. In one embodiment, a flag is signaled in PPS of each picture. If a PPS flag is set to disable for the current picture, then all the slices in the current picture will not use a certain de-blocking filter set. In another embodiment, a flag is signaled in SPS of each picture. If an SPS flag is set to disable for a certain slice, then all the CTUs in the slice will not use a certain de-blocking filter set.

In an embodiment, whether to apply a de-blocking filter set (e.g., with a tap length smaller or equal to 8) is controlled by a flag as well as other factors such as whether a side length of a block boundary is larger than a side length threshold. For example, if a PPS flag is set for a certain picture, then only the filters with a tap length smaller or equal to 8 will be used for a block boundary having a side length larger than a side length threshold of 16. In contrast, if the PPS flag is not set for the current picture, then all the de-blocking filters are disabled.

In an embodiment, a flag indicating whether to apply a deblocking filter set, and a length value indicating how many consecutive lines crossing a block boundary are needed for applying the deblocking filter set are signaled from an encoder side to a decoder side.

At the encoder side, some original and reconstructed samples (pixels) at both sides of a block boundary can be selected to make a deblocking decision. In one embodiment, an objective quality metric, e.g., mean-square error (MSE) or absolute difference value (ABS) between original and reconstructed samples, is calculated using the selected samples. If a difference of an average MSE or ABS value of the both sides is larger than a threshold, then the de-blocking filter set is applied, and the flag can be signaled.

In an embodiment, a human visual system (HVS) based subjective quality assessment metric, e.g., Structural similarity index (SSIM) and Video quality metric (VQM), is calculated from the selected pixels at both sides of block boundary. If a difference value of HVS based quality values of both sides exceeds a threshold, then the de-blocking filter is applied and flag can be signaled.

In an embodiment, in order to save the signaling bits, an inter-side difference value between both sides of the block boundary is further evaluated before sending the flag and the length value. When the inter-side difference value of the both sides of the block boundary is larger than an inter-side difference threshold, the de-blocking flag and length value is signaled.

In an embodiment, in order to save the signaling bits, multiple filter sets can share a signaling flag. For example, a set of filters with a tap length (size) larger than 8 shares a same enable flag. One of the multiple filter sets can be selected by jointly using side lengths of both sides.

III. 5 Filter Length Decision Based on Side Lengths of Both Sides

In the length-adaptive deblocking scheme, in some embodiments, whether to apply a long filter set to a block boundary can first be determined via a series of filtering decisions that, for example, are based on one or a combination of factors, the factors include an inter-side difference, an intra-side difference, a number of consecutive lines of samples, or other factors described herein. When it is determined that a long filter set is to be applied, a filter length or a set of filter lengths can then be determined according to side lengths of both sides of the block boundary. Accordingly, a long filter set can be selected from a set of candidate long filters based on the determined filter length(s). In this way, the resulting long filter set can adapt to the side lengths of both sides of the block boundary.

In an embodiment, a filter set for filtering a P side of a block boundary can have a filter length, filter_len$_p$, in the range shown below:

$$1 \leq \text{filter\_len}_p \leq \text{len}_p. \quad (12)$$

Similarly, a filter set for filtering a Q side of the block boundary can have a filter length, filter_len$_q$, in the range shown below:

$$1 \leq \text{filter\_len}_q \leq \text{len}_q. \quad (13)$$

The side lengths, len$_p$ and len$_q$, can be different (e.g., two blocks adjacent to the block boundary have different widths or heights). Accordingly, the filter lengths of the P and Q sides can be different.

In an embodiment, a filter set is selectively applied to samples at the sides of a block boundary. In other words, a sub set of samples at a P side and Q side of the block boundary is selected and filtered. For example, a ((len$_p$/2)−1)-tap filter set and a ((len$_q$/2)−1)-tap filter set are selected for P and Q sides, respectively, and accordingly only the samples from $p_0$ to $p_{(len_p/2)-1}$ and $q_{(len_q/2)-1}$ are filtered. In another embodiment, only the samples at one side are filtered. For example, only samples from $p_0$ to $p_{(len_p/2)-1}$ or from $q_0$ to $q_{(len_q/2)-1}$ are filtered.

In an embodiment, a filter length is assigned or used for a range of side lengths of block boundaries. For example, a first filter length of 4-tap is used for side lengths, len$_p$, at P side in a range of 8 to 16 samples ($8 \leq \text{len}_p < 16$). A second filter length of 8-tap is assigned for side lengths, len$_p$, at P side in a range of 16 to 64 samples ($16 \leq \text{len}_p < 64$). Based on the above configuration, when a side length of a block boundary at P side falls into the range of $16 \leq \text{len}_p < 64$, the second filter length of 8-tap will be adopted.

In an embodiment, a maximum filter length is set depending on side lengths at both sides of a block boundary. For example, a filter length at P side is selected to be 16 when $128 \leq \text{len}_p$ and $64 \leq \text{len}_q$.

In an embodiment, which filter length is selected depends on a side length and an inter-side difference. For example, a filter length at P side is set to 8 when len$_p \geq 64$ and an inter-side difference value is larger than 5. When the inter-side difference value is larger than 10 and len$_p \geq 64$, the filter length at P side is changed to 16.

Figure 8:
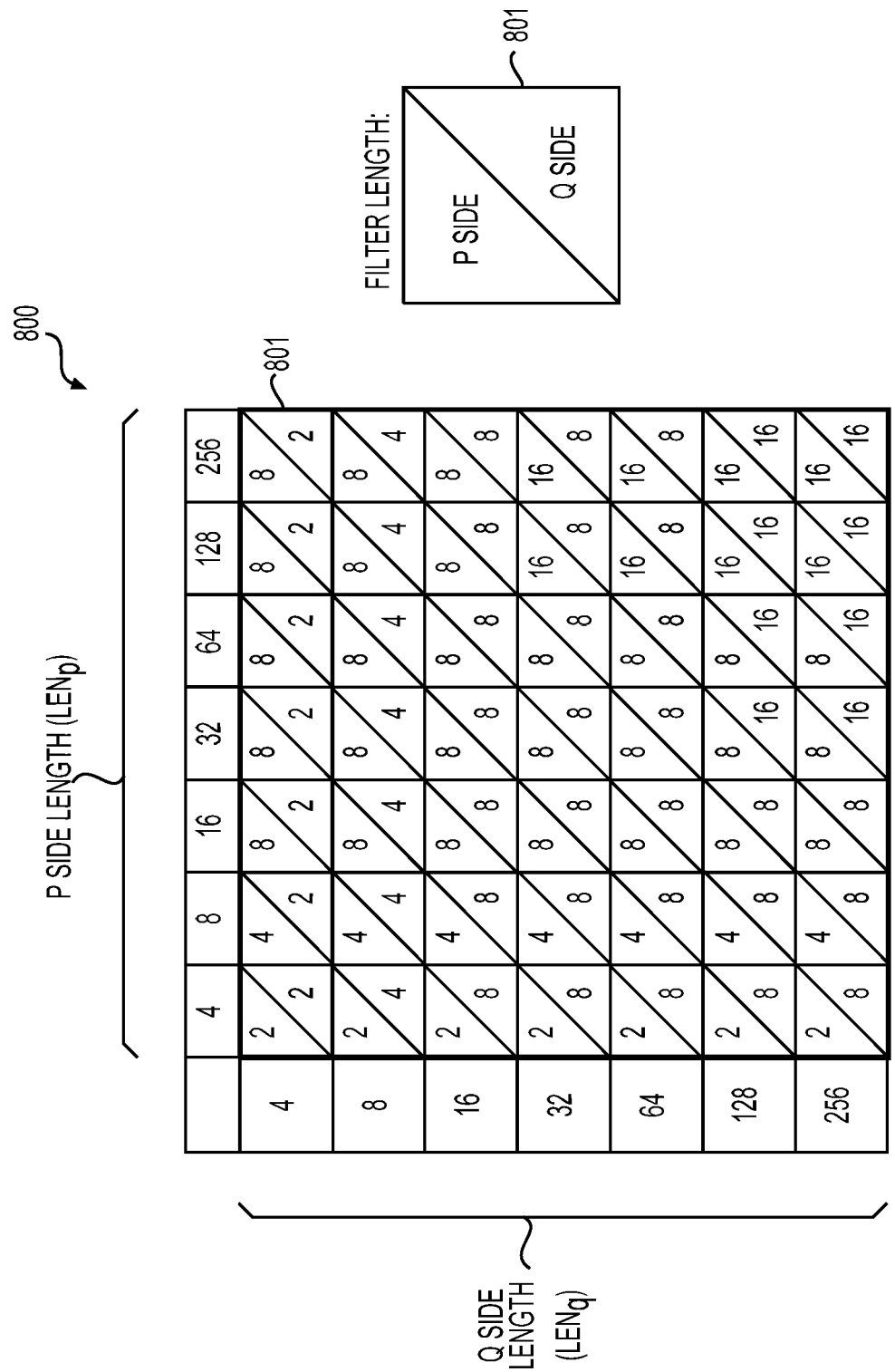
FIG. 8 shows an example of the lookup table according to an embodiment of the disclosure.

In an embodiment, a lookup table is employed to determine filter lengths for both a P side and Q side of a block boundary based on side lengths of the P side and Q side. FIG. 8 shows an example of the lookup table 800. Each column of the lookup table 800 corresponds to a P side length, for example, in a range from 4 samples to 256 samples, while each row of the lookup table 800 corresponds to a Q side length, for example, in a range from 4 samples to 256 samples. Each cell 801 in the lookup table 800 corresponds to a P side length and a Q side length. In each cell 801, a P side filter length and a Q side length are stored.

Accordingly, corresponding to side lengths of the P side and the Q side, filter length for the P or Q side can be determined according to the lookup table 800. For example, for a block boundary having a P side length of 32 samples and a Q side length of 128 samples, an 8-tap filter length will be selected for the P side, while a 16-tap filter length will be selected for the Q side.

III. 6 Filter Length Decision at a Region Boundary

In some embodiments, a filter length is selected with consideration of a region boundary constraint. For example, a picture is partitioned into regions. Each region may be a slice, a tile, a CTU, a CTU row, and the like. The regions may be processed sequentially, and a line buffer may be employed to store sample values of a previous region that is useful for processing a current region. When a block boundary is located along such a region boundary, a side length of the block boundary corresponding to a Q side or P side outside of a current region can be limited by a size of a respective line buffer (a number of lines of samples the line buffer is able to store). Accordingly, selection of a filter length for the side outside of the current region can be based on the line buffer size.

For example, a block boundary is a region boundary with a line buffer of 16 lines of samples, a relatively shorter filter length, such as 4-tap, 6-tap, 8-tap, 10-tap, 12-tap, or 14 tap, can be selected for a side outside of a current region for filtering the block boundary.

III.7 Examples of a Length-Adaptive Deblocking Filtering Process

Figure 9:
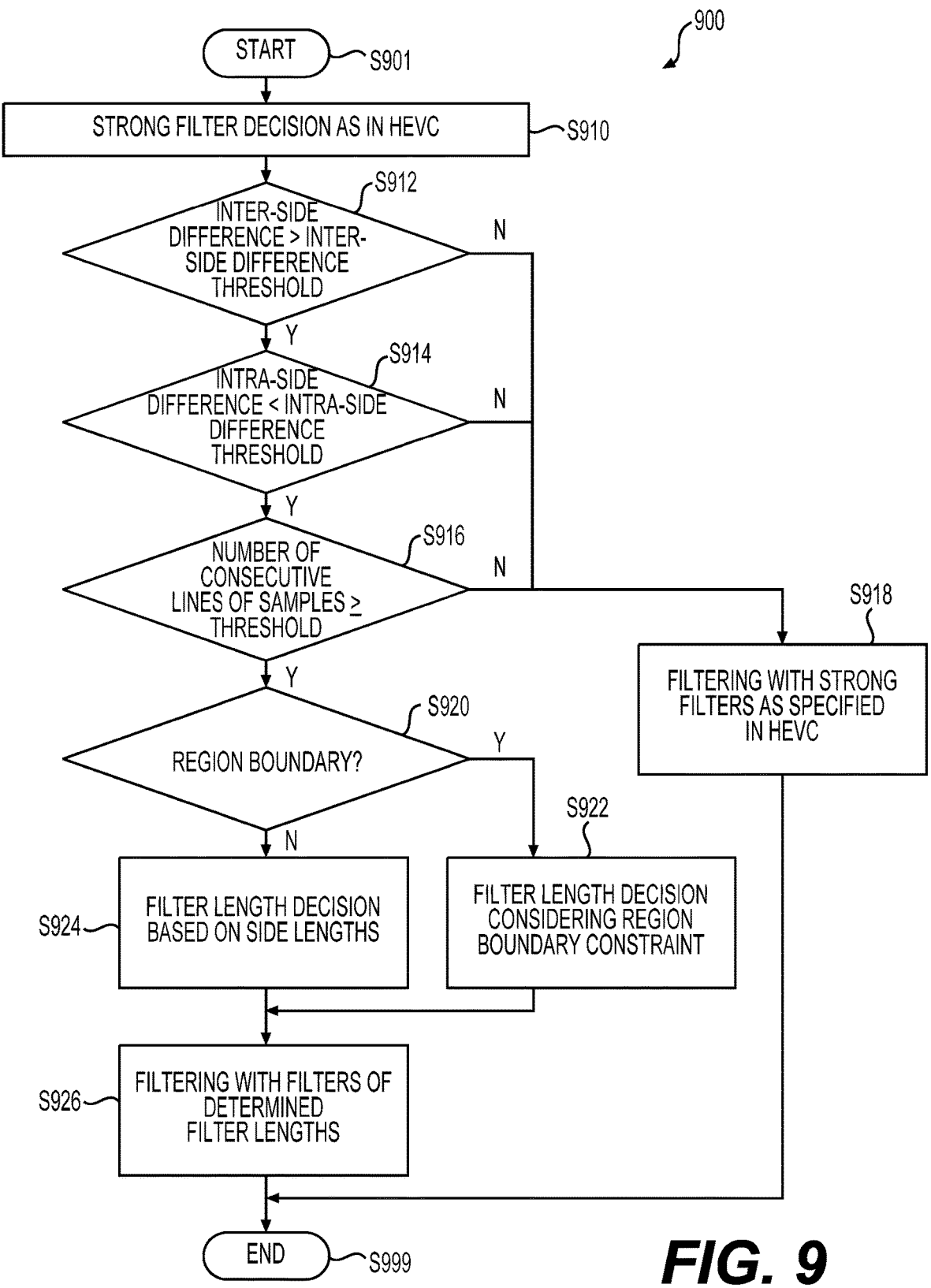
FIG. 9 shows an example length-adaptive deblocking filtering process according to an embodiment of the disclosure.

FIG. 9 shows an example length-adaptive deblocking filtering process 900 according to an embodiment of the disclosure. The process 900 can be performed to determine whether a filter set (e.g., a long filter set) is to be applied to a block boundary, and, if so, to determine filter lengths of filters in the filter set. The process 900 can be performed at the deblocking filter 130 or 230. The process 900 starts from S901 and proceeds to S910.

At S910, a strong filter decision as in HEVC is made. For example, the process 400 can be performed, and as a result, at S440, it is determined a strong filtering is to be performed for processing the block boundary.

At S912, an inter-side difference of a line of samples of the block boundary can be evaluated with an inter-side difference threshold. When the inter-side difference is greater than the inter-side difference threshold, the process proceeds to S914; otherwise, the process proceeds to S918. In alternative examples, inter-side differences of multiple lines of samples may be evaluated.

At S914, an intra-side difference of the line of samples evaluated at S912 is compared with an intra-side difference threshold. When the intra-side difference is smaller than the intra-side difference threshold, the process 900 proceeds to S916; otherwise, the process proceeds to S918. In alternative examples, intra-side differences of multiple lines of samples may be evaluated.

At S916, it is determined whether a number of consecutive lines crossing the block boundary that satisfies a certain set of conditions (e.g. conditions considered at S912 and S914) is greater or equal to a threshold. When the number of consecutive lines satisfying the set of conditions is greater or equal to the threshold, the process 900 proceeds to S920; otherwise, proceeds to S918.

At S918, a deblocking filtering with strong filters as defined in the HEVC standard can be performed to reducing block artifacts at the block boundary. The process 900 then proceeds to S999, and terminates at S999.

At S920, whether the block boundary is a region boundary is determined. When the block boundary is a region boundary, the process 900 proceeds to S922; otherwise, proceeds to S924.

At S922, a filter length decision is made with consideration of a region boundary constraint regarding a size of a line buffer. For example, a filter length(s) for filtering samples outside of a current region under processing is determined to be smaller than or equal to the line buffer size. For the P or Q side within the current region, filter lengths can be determined according to the respective side length of the block boundary.

At S924, a filter length decision is made based on side lengths of a Q side and a P side of the block boundary. For example, the filter set to be applied to the block boundary may include one or more filters for samples at the P side and/or Q side. The filters for the P side (or Q side) may share a same filter length or may have different filter lengths. The filter length for the P side or Q side can be determined according to the side lengths of the P side and Q side as described herein. For example, as a result of the filter length decision, one or more filter lengths may be determined for each side of the block boundary.

At S926, a deblocking filtering is performed with filters of the determined filter lengths, either determined at S922 or S924. In some examples, only one side of the block boundary is filtered. In some examples, a subset of samples at the P side or Q side is filtered and replaced with a filtered sample value. The process proceeds to S999 and terminates at S999.

It is noted that, in different embodiments, the steps in the process 900 may be performed in different order, and some steps may be omitted or performed in parallel.

Figure 10:
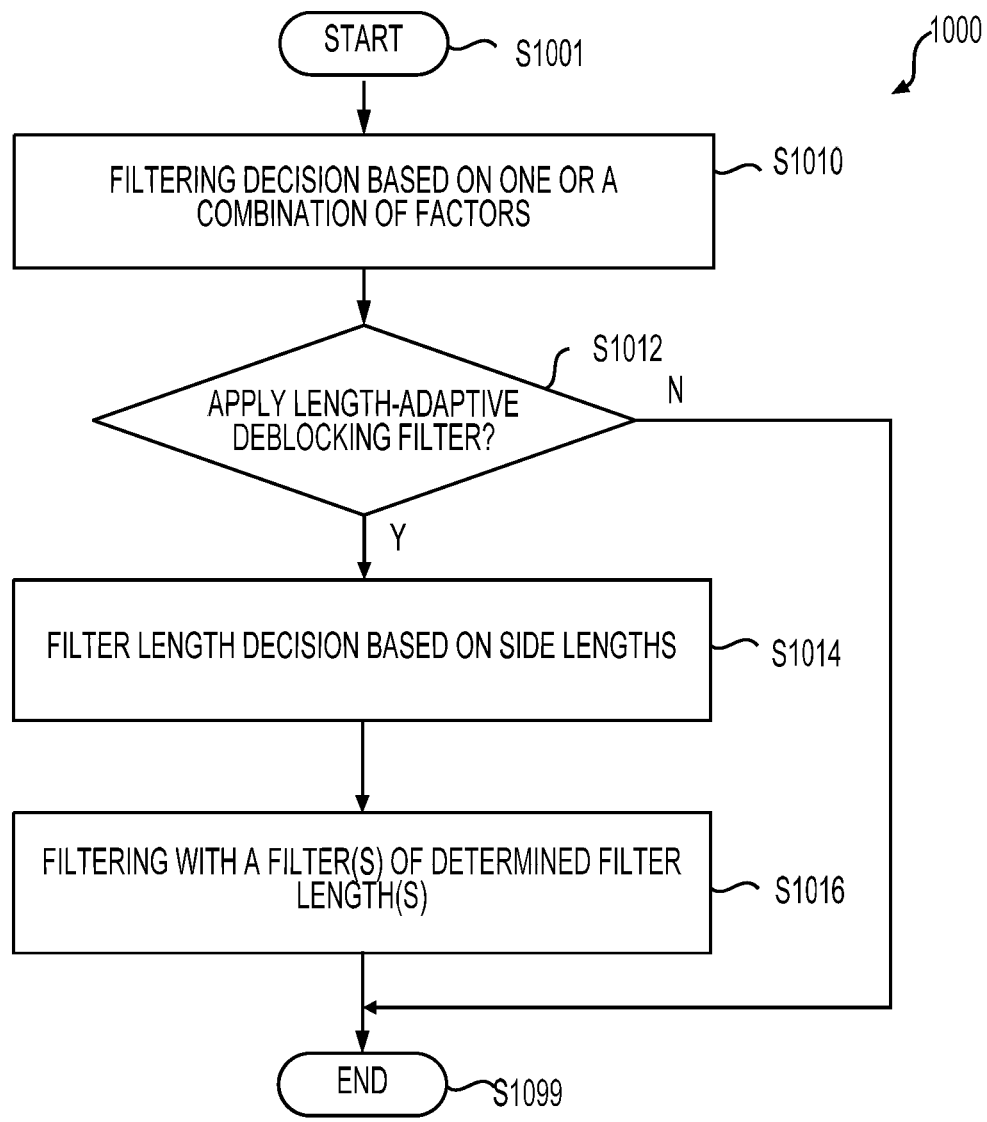
FIG. 10 shows another example length-adaptive deblocking filtering process according to an embodiment of the disclosure.

FIG. 10 shows another example length-adaptive deblocking filtering process 1000 according to an embodiment of the disclosure. The process 1000 can be performed to determine whether a filter set (e.g., a long filter set) is to be applied to a block boundary, and, if so, to determine filter lengths of filters in the filter set. The process 1000 can be performed at the deblocking filter 130 or 230. The process 1000 starts from S1001 and proceeds to S1010.

At S1010, the filter decision associated with the length-adaptive deblocking filter is made based on one or a combination of the factors such as the inter-side difference between samples at opposite sides of the block boundary, an intra-side difference indicating smoothness of sample values, the continuity of discontinuities along the block boundary, the type of the block boundary, the color component of the samples to be filter, the prediction types of the coding blocks, the motion information of the coding blocks, the residual difference between the coding blocks, and other characteristics associated with the coding blocks. For example, when the inter-side difference is considered for making the filter decision, the length-adaptive deblocking filter can be applied if the inter-side difference is greater than an inter-side difference threshold. When the intra-side difference is considered for making the filter decision, the length-adaptive deblocking filter can be applied if the intra-side difference is smaller than an intra-side difference threshold. When the continuity of discontinuities along the block boundary is considered for making the filter decision, the length-adaptive deblocking filter can be applied if a predetermined number of consecutive lines of samples each satisfy a predetermined condition.

At S1012, whether the length-adaptive deblocking filter is to be applied on the block boundary is determined according to the filter decision made at S1010. When the length-adaptive deblocking filter is to be applied, the process 1000 proceeds to S1014; otherwise, proceeds to S1099.

At S1014, a filter length decision is made based on side lengths of a Q side and a P side of the block boundary. For example, the filter set to be applied to the block boundary may include one or more filters for samples at the P side and/or Q side. The filters for the P side (or Q side) may share a same filter length or may have different filter lengths. The filter length for the P side or Q side can be determined according to the side lengths of the P side and Q side as described herein. For example, as a result of the filter length decision, one or more filter lengths may be determined for each side of the block boundary. When the block boundary is a region boundary, a filter length(s) for filtering samples outside of a current region under processing is determined to be smaller than or equal to the line buffer size. For the P or Q side within the current region, filter lengths can be determined according to the respective side length of the block boundary.

At 51016, a deblocking filtering is performed with filters of the determined filter lengths, determined at S1014. In some examples, only one side of the block boundary is filtered. In some examples, a subset of samples at the P side or Q side is filtered and replaced with a filtered sample value. The process proceeds to S1099 and terminates at S1099.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. A computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   receiving reconstructed video data associated with a block boundary between two coding blocks in a video coding system, the block boundary having N lines of samples crossing the block boundary from a. P side of the boundary to a Q side of the boundary, the two coding blocks each corresponding to a coding unit (CU), a prediction unit (PU), or a transform unit (TU);
   determining whether to apply a first filter set to reduce block artifacts at the block boundary, the determining whether to apply the first filter set to reduce block artifacts at the block boundary including:
      determining whether an intra-side difference of a first line of the N lines of samples is smaller than a first intra-side difference threshold, the intra-side difference of the first line indicating variations of sample values at the P side and Q side of the first line of the N lines of samples, and
      determining whether to apply the first filter set to two consecutive lines of samples among the N lines of samples according to whether the two consecutive lines of samples each satisfy a same set of conditions, the same set of conditions comprising at least one of an inter-side difference of the respective one of the two consecutive lines of samples is greater than an inter-side difference threshold and an intra-side difference of the respective one of the two consecutive lines of samples is smaller than a second intra-side difference threshold;
   determining a filter length of a filter in the first filter set based on a first side length ($len_p$) of samples in each line of samples at the P side, and a second side length ($len_q$) of samples in each line of samples at the Q side, the first side length ($len_p$) being a width or height of one of the two coding blocks at the P side, the second side length ($len_q$) being a width or height of one of the two coding blocks at the Q side; and
   applying at least one filter in the first filter set with the determined filter length on the block boundary.

2. The method of claim 1, wherein the intra-side difference of the first line of the N lines of samples is determined according to:

$$\Sigma_{s=0}^{len_p-1}(m_s \times |p_s-p_x|) + \Sigma_{t=0}^{len_q-1}(n_t \times |q_t-q_y|),$$

where s, x, t and y are integers, $0 < x < len_p - 1$, $0 < y < len_q - 1$, $p_k$ (k=s or x) or $q_k$ (k=t or y) represents a sample value for a sample at the P side or Q side respectively, k indicates a position of the respective sample in the first line of samples at the Q side or P side, $m_s$ is 0 or 1, and $n_t$ is 0 or 1.

3. The method of claim 1, wherein the determining whether to apply the first filter set to reduce block artifacts at the block boundary further includes:
   when the block boundary is a region boundary associated with a line buffer having a size of M lines, determining a filter length of a filter in the filter set that is smaller than the size of the line buffer for the P side or Q side the samples of which are stored in the line buffer.

4. The method of claim 1, further comprising:
   determining whether to enable a first filtering mode or a second filtering mode, the first filtering mode having a stronger filtering effect that the second filtering mode; and
   when it is determined to enable a strong filter mode, proceeding to the determining whether to apply the first filter set to reduce block artifacts at the block boundary.

5. The method of claim 1, wherein the first filter set is selected from a set of candidate filters that includes a filter having a filter length in a range from 1-tap to 16-tap.

6. The method of claim 1, wherein an inter-side difference of the first line of the N lines of samples is determined based on one of:

$$|p_0-q_0|,$$

$$(m \times |p_0-q_1| + n \times |p_1-q_0|)/(m+n),$$

$$|m \times (p_0-q_1) + n \times (p_1-q_0)|/(m+n),$$

$$(m \times |p_0-q_0| + n \times |p_1-q_1|)/(m+n), \text{ or}$$

$$|\Sigma_{s=0}^{len_p-1}(m_s \times p_s) - \Sigma_{t=0}^{len_q-1}(n_t \times q_t)|,$$

where m and n are integers, $p_k$ or $q_k$ (k=0, 1, s, or t) represents a sample value of the sample at a position indicated by k in the first line of the N lines of samples at the P side or Q side, respectively, $m_s$ or $n_t$ represents a weight corresponding to the respective sample value $p_s$ or $q_t$ respectively, $\Sigma_s m_s = 1$, and $\Sigma_t n_t = 1$.

7. The method of claim 1, wherein the determining whether to apply the first filter set to reduce block artifacts at the block boundary further includes:
   determining whether to apply the first filter set to reduce block artifacts at the block boundary according to one or more of:
      reference picture difference between the P side and Q side,
      motion vector difference between the P side and Q side,
      prediction types of the P side and Q side,
      residual difference between the P side and Q side,
      color component of the N lines of samples, or
      whether a picture, slice, or blocks at P side and Q side including the bock boundary is intra coded.

8. The method of claim 1, wherein the inter-side difference threshold, the first intra-side difference threshold, and/or the second intra-side difference threshold, the first intra-side difference threshold, and/or the second intra-side difference threshold is one of:
 a value selected from values predefined for each quantization parameter (QP) used at the video coding system,
 a value derived from threshold values $t_c$ and $\beta$ as specified in High Efficiency Video Coding (HEVC) standards,
 a value selected from values predefined for each QP plus a picture level offset value,
 a value indicated in a video parameter set (VPS), a sequence parameter set (SPS), a picture parameter set (PPS), a slice header, or a coding unit (CU), or
 a just-noticeable-difference (JND) value calculated based on neighboring samples along the block boundary.

9. The method of claim 1, further comprising:
 signaling a flag indicating whether to apply the first filter set; and
 signaling a length value as a threshold, wherein whether to apply the first filter set is determined based on whether a number of consecutive lines each satisfying a set of conditions is greater than or equal to the threshold.

10. The method of claim 1, wherein the determining the filter length of the filter in the first filter set based on the first side length ($len_p$) and the second side length ($len_q$) includes:
 determining the filter length of the filter that is to be applied at the P side, the filter length being in a range between 1 and $len_p$, or
 determining the filter length of the filter that is to be applied at the Q side, the filter length being in a range between 1 and $len_q$,
 where filter lengths of filters to be applied at the P side and the Q side are the same or different.

11. The method of claim 1, wherein the determining the filter length of the filter in the first set based on the first side length ($len_p$) and the second side length ($len_q$) includes:
 determining the filter length of the filter to be applied at the P side to be a filter length assigned to a side length range that includes the first side length ($len_p$), or
 determining the filter length of the filter to he applied at the Q side to be a filter length assigned to a side length range that includes the second side length ($len_p$),
 wherein, for the P side or Q side, a side length range including larger side length values is assigned with a larger filter length than a side length range including smaller side length values.

12. The method of claim 1, wherein the determining the filter length of the filter in the first set based on the first side length ($len_p$) and the second side length ($len_q$) includes:
 determining a filter length for the P side or Q side based on the first side length ($len_p$), the second side length ($len_q$), and an inter-side difference of the first line of the N lines of samples.

13. The method of claim 1, wherein the applying the at least one filter in the first filter set with the determined filter length on the block boundary comprises:
 applying the first filter set to a subset of samples at the P side or Q side to reduce block artifacts at the block boundary.

14. The method of claim 1, wherein the determining the filter length of the filter in the first set based on the first side length ($len_p$) and the second side length ($len_q$) includes:
 determining a first filter tap length for the P side and a second filter tap length for the Q side according to a look-up table that specifies a pair of filter tap lengths for the P side and Q side, respectively, for each combination of a possible side length of the Q side and a possible side length of the P side of the block boundary.

15. An apparatus, comprising circuitry configured to:
 receive reconstructed video data associated with a block boundary between two coding blocks, the block boundary having N lines of samples crossing the block boundary from a P side of the boundary to a Q side of the boundary the two coding blocks each corresponding to a coding unit (CU), a prediction unit (PU), or a transform unit (TU);
 determine whether to apply a first filter set to reduce block artifacts at the block boundary based on:
  whether an intra-side difference of a first line of the N lines of samples is smaller than a first intra-side difference threshold, the intra-side difference of the first line indicating variations of sample values at the P side and Q side of the first line of the N lines of samples, and
  determination of whether to apply the first filter set to two consecutive lines of samples among the N lines of samples according to whether the two consecutive lines of samples each satisfy a same set of conditions, the same set of conditions comprising at least one of an inter-side difference of the respective one of the two consecutive lines of samples is greater than an inter-side difference threshold and an intra-side difference of the respective one of the two consecutive lines of samples is smaller than a second intra-side difference threshold;
 determine a filter length of a filter in the first filter set based on a first side length ($len_p$) of samples in each line of samples at the P side, and a second side length ($len_q$) of samples in each line of samples at the Q side, the first side length ($len_p$) being a width or height of one of the two coding blocks at the P side, the second side length ($len_q$) being a width or height of one of the two coding blocks at the Q side; and
 apply at least one filter in the first filter set with the determined filter length on the block boundary.

16. A non-transitory computer-readable medium storing instructions that, when executed by processing circuitry, cause to the processing circuitry to perform a method, the method comprising:
 receiving reconstructed video data associated with a block boundary between two coding blocks in a video coding system, the block boundary having N lines of samples crossing the block boundary from a P side of the boundary to a Q side of the boundary, the two coding blocks each corresponding to a coding unit (CU), a prediction unit (PU), or a transform unit (TU);
 determining whether to apply a first filter set to reduce block artifacts at the block boundary, the determining whether to apply the first filter set to reduce block artifacts at the block boundary including:
  determining whether an intra-side difference of a first line of the N lines of samples is smaller than a first intra-side difference threshold, the intra-side difference of the first line indicating variations of sample values at the P side and Q side of the first line of the N lines of samples, and
  determining whether to apply the first filter set to two consecutive lines of samples among the N lines of samples according to whether the two consecutive lines of samples each satisfy a same set of conditions, the same set of conditions comprising at least one of an inter-side difference of the respective one of the two consecutive lines of samples is greater than an inter-side difference threshold and an intra-side difference of the respective one of the two consecutive lines of samples is smaller than a second intra-side difference threshold;

determining a filter length of a filter in the first filter set based on a first side length ($len_p$) of samples in each line of samples at the P side, and a second side length ($len_q$) of samples in each line of samples at the Q side, the first side length ($len_p$) being a width or height of one of the two coding blocks at the P side, the second side length ($len_q$) being a width or height of one of the two coding blocks at the Q side; and applying at least one filter in the first filter set with the determined filter length on the block boundary.

17. The method of claim 1, further comprising:

for every two consecutive lines among the N lines of samples, determining whether to apply the first filter set to the every two consecutive lines of samples according to whether the every two consecutive lines of samples each satisfy the same set of conditions.

18. The method of claim 1, wherein the step of determining whether to apply the first filter set to two consecutive lines of samples among the N lines of samples is performed multiple times until the two consecutive lines of the N lines is the last set of two consecutive lines of the N lines.

19. The apparatus of claim 15, wherein the circuitry is further configured to:

for every two consecutive lines among the N lines of samples, determine whether to apply the first filter set to the every two consecutive lines of samples according to whether the every two consecutive lines of samples each satisfy the same set of conditions.

20. The apparatus of claim 15, wherein the circuitry is configured to perform determining whether to apply the first filter set to two consecutive lines of samples among the N lines of samples multiple times until the two consecutive lines of the N lines is the last set of two consecutive line of the N lines.

* * * * *